(12) United States Patent
Kong et al.

(10) Patent No.: US 11,543,258 B2
(45) Date of Patent: Jan. 3, 2023

(54) PERSONALIZED NOTIFICATION SYSTEM FOR MOBILITY AS A SERVICE

(71) Applicant: TOYOTA RESEARCH INSTITUTE, INC.

(72) Inventors: Soon Ho Kong, Arlington, MA (US); Jonathan Decastro, Arlington, MA (US); Nikos Arechiga Gonzalez, San Mateo, CA (US); Frank Permenter, Cambridge, MA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 253 days.

(21) Appl. No.: 16/413,218

(22) Filed: May 15, 2019

(65) Prior Publication Data

US 2020/0363229 A1    Nov. 19, 2020

(51) Int. Cl.
*G01C 21/36* (2006.01)
*B60Q 9/00* (2006.01)

(52) U.S. Cl.
CPC ......... *G01C 21/3641* (2013.01); *B60Q 9/00* (2013.01); *G01C 21/3629* (2013.01); *G01C 21/3652* (2013.01)

(58) Field of Classification Search
CPC ................................................ G01C 21/3641
See application file for complete search history.

(56) References Cited

U.S. PATENT DOCUMENTS

| | | | |
|---|---|---|---|
| 9,493,116 B2* | 11/2016 | Kiefer | B60W 50/16 |
| 10,198,700 B2 | 2/2019 | Farrelly et al. | |
| 10,345,114 B2* | 7/2019 | Apley | G08G 5/0091 |
| 10,553,115 B1* | 2/2020 | Ismaili | G08G 1/0967 |
| 10,723,367 B2* | 7/2020 | Tamagaki | B60K 28/06 |
| 2006/0009905 A1 | 1/2006 | Soderberg et al. | |
| 2009/0234573 A1* | 9/2009 | Notarantonio | G06Q 30/0283 |
| | | | 705/400 |
| 2013/0311641 A1* | 11/2013 | Chow | G08G 1/04 |
| | | | 709/224 |
| 2014/0009275 A1* | 1/2014 | Bowers | G08G 1/163 |
| | | | 340/436 |
| 2014/0118168 A1* | 5/2014 | Lee | G08G 1/096725 |
| | | | 340/905 |

(Continued)

FOREIGN PATENT DOCUMENTS

DE    102017109734 A1 *   5/2016

OTHER PUBLICATIONS

Google Machine translation of DE102017109734A1 to Hancock (Feb. 22, 2022).*

(Continued)

*Primary Examiner* — Jean Paul Cass
(74) *Attorney, Agent, or Firm* — Seyfarth Shaw LLP

(57) ABSTRACT

A personalized notification method for a mobility as a service (MaaS) vehicle includes receiving conditional personalized notification features from a passenger of the MaaS vehicle. The method also includes monitoring current driving environment of the MaaS vehicle to determine whether a condition of the conditional personalized notification features is satisfied. The method further includes notifying the passenger when the condition is satisfied via at least one localized output device in a compartment of the MaaS vehicle.

12 Claims, 8 Drawing Sheets

(56) References Cited

U.S. PATENT DOCUMENTS

| | | | | |
|---|---|---|---|---|
| 2014/0172467 | A1* | 6/2014 | He | A61B 5/18 |
| | | | | 705/4 |
| 2014/0266650 | A1* | 9/2014 | Newhouse | G01F 23/80 |
| | | | | 340/425.5 |
| 2016/0216130 | A1* | 7/2016 | Abramson | G01C 21/3484 |
| 2016/0370194 | A1* | 12/2016 | Colijn | G08G 1/202 |
| 2017/0343375 | A1* | 11/2017 | Kamhi | G01C 21/20 |
| 2018/0170255 | A1* | 6/2018 | Hashimoto | H04R 1/025 |
| 2018/0276875 | A1* | 9/2018 | Pylvaenaeinen | G06T 17/00 |
| 2018/0356237 | A1* | 12/2018 | Abramson | G01C 21/3626 |
| 2019/0212849 | A1* | 7/2019 | Patel | B60N 2/0228 |
| 2019/0232951 | A1* | 8/2019 | Dudar | B60W 20/50 |
| 2020/0005281 | A1* | 1/2020 | Patel | G06Q 20/3255 |

OTHER PUBLICATIONS

Google Machine translation of JP6292218B2 to DENSO (Apr. 3, 2015).*

Transitapp.com, "Transit—Live Transport App", transitapp.com, page accessed Feb. 27, 2019.

Moovit, "Moovit: Bus, Rail, Timetables, Maps", play.google.com, Feb. 16, 2019.

Jittrapirom, et al., "Mobility as a Service: A Critical Review of Definitions, Assessments of Schemes, and Key Challenges", Urban Planning vol. 2, Issue 2, Jan. 1, 2017, pp. 13-25.

* cited by examiner

PERSONALIZED NOTIFICATION SYSTEM FOR MOBILITY AS A SERVICE

BACKGROUND

Field

Certain aspects of the present disclosure generally relate to mobility as a service and, more particularly, to a personalized notification system for mobility as a service.

Background

Historically, vehicle navigation has helped vehicle users with routing to a destination. Many current vehicle navigation systems provide users with the ability locate a desired destination with audio and video directional outputs. While these current vehicle navigation systems have been beneficial for routing vehicles, these current systems are generally static in nature. Additionally, users may elect not to use the navigation system for a trip.

In addition, passengers on public or private transportation systems desire to know when, where, and which vehicle to board at a start of a trip. Passengers may also like to know when to exit the vehicle at an end of a trip and/or when to make connections and changes. In some cases, passengers miss their destination because they are unaware of their current location. This problem of missing destinations due to unawareness of locations is intensified when the vehicle is not equipped with address systems or when the address systems are dysfunctional. Thus, a passenger who is subject to distractions (e.g., due to sleep, conversations), handicap, overcrowding etc., can easily lose track of information about their destination. Thus, it is desirable to provide an improved system for alerting passengers in a vehicle.

SUMMARY

In one aspect of the present disclosure, a personalized notification method for a mobility as a service (MaaS) vehicle is disclosed. The method includes receiving conditional personalized notification features from a passenger of the MaaS vehicle. The method also includes monitoring current driving environment of the MaaS vehicle to determine whether a condition of the conditional personalized notification features is satisfied. The method also includes notifying the passenger when the condition is satisfied via at least one localized output device in a compartment of the MaaS vehicle.

Another aspect of the present disclosure is directed to an apparatus for personalized notification of an occupant of a mobility as a service (MaaS) vehicle. The apparatus having a memory and one or more processors coupled to the memory. The processor(s) is configured to receive conditional personalized notification features from a passenger of the MaaS vehicle. The processor(s) is also configured to monitor current driving environment of the MaaS vehicle to determine whether a condition of the conditional personalized notification features is satisfied. The processor(s) is also configured to notify the passenger when the condition is satisfied via at least one localized output device in a compartment of the MaaS vehicle.

In another aspect of the present disclosure, a non-transitory computer-readable medium with non-transitory program code recorded thereon is disclosed. The program code is personalized notification of an occupant of a mobility as a service (MaaS) vehicle. The program code is executed by a processor and includes program code to receive conditional personalized notification features from a passenger of the MaaS vehicle. The program code also includes program code to monitor current driving environment of the MaaS vehicle to determine whether a condition of the conditional personalized notification features is satisfied. The program code also includes program code to notify the passenger when the condition is satisfied via at least one localized output device in a compartment of the MaaS vehicle.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
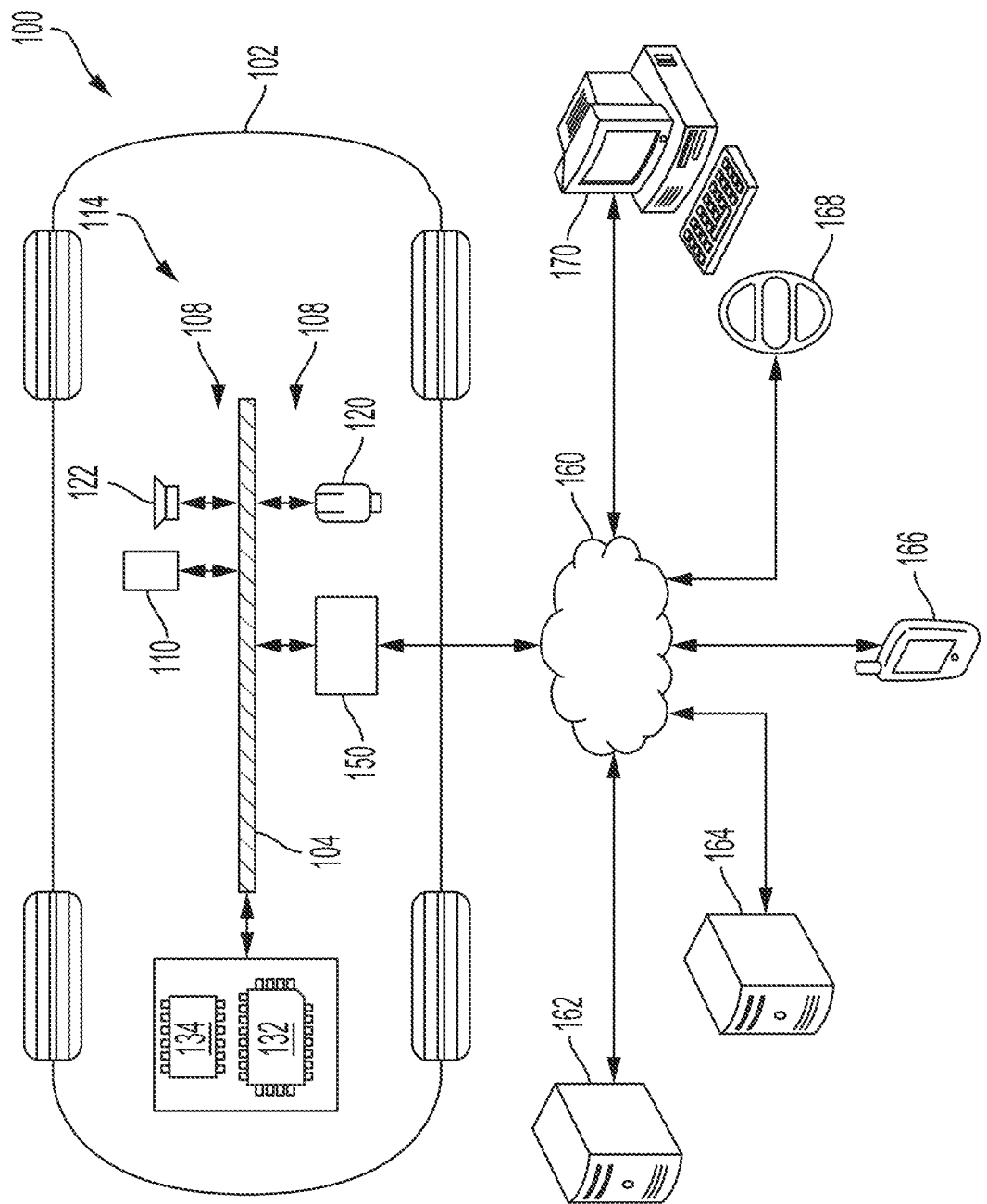
FIG. 1 schematically depicts a network environment for implementing one or more of vehicle access, scheduling, and/or routing options, according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Passengers using MaaS (mobility as a service) can set up conditional notifications in a MaaS vehicle. The conditional notifications may mitigate a passenger's need to actively check the current location and the distance to a destination. For example, instead of checking the current location, a passenger can take a nap, read a book, watch a movie, or use a virtual reality (VR) headset.

When a mobility as a service passenger is in a vehicle, he or she can set up conditional personalized notification features and/or set a notification preference. The notification preference refers to a method for generating notifications in the vehicle. The passenger can set up the conditional personalized notification features and the notification method using a mobile application on a mobile device or a personalized display/interface of a personalized notification system in a vehicle. For example, conditional logic allows users to express a conjunction or disjunction of the following predicates:

A distance to a destination (for example, "if the destination is less than fifty meters (50 m) away")

An estimated time to the destination (for example, "if an estimated time of arrival (ETA) is less than five minutes")

Emergency situation: In autonomous driving, there may already be a system for detecting an emergency. When the vehicle does not have a system for detecting an emergency, a driver may be tasked with informing passengers or a system that the vehicle is (or will be) in an emergency situation. For example, "the vehicle is pulled over by a police" or "the vehicle is involved in a traffic accident." In some aspects, information received from a sensor can be used to determine that the vehicle is in an emergency situation.

A user can also specify the method to be notified. The specification can be made through the user's mobile device or the personalized display/interface in the vehicle. For example, a user may specify to be notified:

Via the user's mobile device (either bell or vibrate);

Via the user's seat by a gentle vibration; and

Via the vehicle's audio system.

After setting up the notification, the personalized notification system monitors current driving situations and checks whether a condition is satisfied. For example, the current driving environment of the vehicle is monitored to determine whether a condition of the conditional personalized notification features is satisfied. In one aspect, the personalized notification system uses the vehicle's current location (e.g., obtained via a global positioning system (GPS)), speed (e.g., also obtained via GPS), the route to the next destination, and the current traffic information to evaluate each condition.

When a condition is satisfied, the system notifies the corresponding passenger. The notification may be an audio output, haptic feedback, a visual notification, and/or another type of notification. The passenger may be notified via at least one output device in a compartment of the vehicle. Each output device is coupled to an existing stereo system, an existing visual output device, or an existing haptic output device.

In one aspect, the personalized notification system notifies the passenger by selecting one or more output devices coupled to the personalized notification system. The one or more output devices are selected based on a notification method selected by the passenger. For example, if the passenger wants to be notified via a vibration in the seat of the vehicle, an output device on the seat of the vehicle is selected. As another example, if the passenger wants to be notified via an audio output, an output device (e.g., a speaker) of the vehicles audio system is selected. The passenger is notified by the one or more selected output devices. In one configuration, the notification is prioritized over other outputs from a vehicle's stereo or audio system. In one aspect, the notification is morphed based on a proximity of the vehicle to a destination, a relative speed of the vehicle, and/or another condition.

The personalized notification system according to aspects of the present disclosure enhances the user experience, and provides adequate time for a passenger to save their belongings before arrival. Moreover, the personalized notification system may also save time of other passengers and increase an overall throughput of MaaS services. The personalized notification system further reduces response time to emergency situations.

FIG. 1 schematically depicts a network environment for implementing one or more of vehicle access, scheduling, and/or routing options, according to aspects of the present disclosure. A system 100 includes a vehicle 102. It is noted that, while the vehicle 102 is depicted as an automobile, the vehicle 102 may be any passenger or non-passenger vehicle such as, for example, a terrestrial, aquatic, and/or airborne vehicle. The vehicle 102 may include a vehicle computing device 114 and/or other components. For example, the vehicle computing device 114 may include a communication path 104 that provides data interconnectivity between various vehicle modules disposed within the vehicle 102. Accordingly, the communication path 104 communicatively couples any number of vehicle modules with one another, and allows the vehicle modules to operate in a distributed computing environment.

Each of the vehicle modules can operate as a node that may send and/or receive data. In some aspects, the communication path 104 may include a conductive material that permits the transmission of electrical data signals to processors, memories, sensors, and actuators throughout the vehicle 102. In another aspect, the communication path 104 can be a bus, such as for example a local interconnect network (LIN) bus, a controller area network (CAN) bus, a vehicle area network (VAN) bus, and the like. In further aspects, the communication path 104 may be wireless and/or an optical waveguide. Components that are communicatively coupled may include components capable of exchanging data signals with one another such as, for example, electrical signals via a conductive medium, electromagnetic signals via air, optical signals via optical waveguides, and the like.

The vehicle 102 generally includes input/output hardware 108 communicatively coupled with the communication path 104. The input/output hardware 108 serves as an interconnection between a human driver and the vehicle 102. The input/output hardware 108 can be any device capable of transforming mechanical, optical, and/or electrical signals into a data signal capable of transmission via the communication path 104. Moreover, the input/output hardware 108 can include any device capable of transforming a data signal into a mechanical, optical, and/or electrical output. Each individual component of the input/output hardware 108 may include one or more processors and one or more memories. In some aspects, each individual component of the input/output hardware 108 can omit a processor and/or a memory. Accordingly, it is noted that, while specific components are described herein as including a processor and/or a memory, the aspects described herein should not be so limited.

In some aspects, the input/output hardware 108 can include a tactile input device 110 such as, for example, a button, a switch, a knob, or the like. The physical motion of the tactile input device 110 can be digitized into a data signal that can be transmitted to a vehicle component. The input/output hardware 108 can further include a microphone 120 for receiving input from a user. The microphone 120 can be any sensor that transforms mechanical vibrations into a data signal. A sensor may include any device that measures a physical quantity and converts it into a data signal, which is correlated to the measured value of the physical quantity, such as, for example, an electrical signal, an electromagnetic signal, an optical signal, a mechanical signal, or the like.

The input/output hardware 108 may also include a speaker 122 for transforming data signals into mechanical vibrations. It should be noted that a signal may include a waveform (e.g., electrical, optical, magnetic, mechanical or electromagnetic), such as direct current (DC), alternating current (AC), sinusoidal-wave, triangular-wave, square-wave, vibration, and the like, capable of traveling through a medium.

Similarly, the input/output hardware 108 can include one or more displays or interfaces for visually presenting or receiving data (e.g., conditional personalized notification features and/or a passenger notification method in the vehicle). The display can be located anywhere in the passenger compartment (e.g., the back of a front seat of the vehicle where it is accessible by a back seat passenger) of the vehicle 102 and can include any medium capable of transmitting a visual output such as, for example, a cathode ray tube, light emitting diodes, liquid crystal displays, plasma displays, or the like. Each of the one or more displays can be a touch screen that, in addition to providing visual information, detects the presence and location of a tactile input upon a surface of or adjacent to the display. Accordingly, each display can receive mechanical input directly upon the optical output provided by the display.

In some aspects, the vehicle 102 may include a processor 132 communicatively coupled with a memory component 134. The memory component 134 may be configured to store one or more pieces of logic. It is also noted that, while the vehicle computing device 114 includes a single processor 132 and a single memory component 134; this is merely one example. For example, the vehicle 102 and/or vehicle computing device 114 may include a plurality of components each having one or more memories and/or processors that are communicatively coupled with one or more of the other components. Thus, the aspects described herein may utilize a distributed computing arrangement to perform any portion of the logic described herein.

According to the aspects described herein, the processor 132 may include any device capable of executing machine-readable instructions, which may be stored on a non-transitory computer-readable medium. Accordingly, each processor may include a controller, an integrated circuit, a microchip, a computer, and/or any other computing device. The memory described herein may include RAM, ROM, a flash memory, a hard drive, and/or any device capable of storing machine-readable instructions.

Aspects of the present disclosure include logic that includes machine-readable instructions and/or functions written in any programming language of any generation (e.g., first generation language (1GL), second generation language (2GL), third generation language (3GL), fourth generation language (4GL), and/or fifth generation language (5GL)) such as, e.g., machine language that may be directly executed by the processor, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

Moreover, the logic can be distributed over various components that are communicatively coupled over a network 160 that may include one or more cellular networks, satellite networks, and/or computer networks. For example, the network may be a wide area network, a local area network, personal area network, and/or a global positioning system. Accordingly, the vehicle 102 can be communicatively coupled to the network 160 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth™, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Thus, any components of the vehicle 102 can utilize one or more network 160 components to transmit signals over the Internet or World Wide Web.

In some aspects, the vehicle 102 includes network interface hardware 150 for communicatively coupling the vehicle 102 with the network 160. The network interface hardware 150 can be communicatively coupled to the communication path 104 and can be any device capable of transmitting and/or receiving data via the network 160. Accordingly, the network interface hardware 150 can include an antenna and/or other communication transceiver for sending and/or receiving any wired or wireless communication. For example, the network interface hardware 150 may include an antenna, a modem, LAN port, Wi-Fi card, WiMax card, mobile communications hardware, near-field communication hardware, satellite communication hardware, and/or any wired or wireless hardware for communicating with other networks and/or devices.

The network 160 can communicatively couple the vehicle 102 with other devices in a flexible client-server relationship. More specifically, the vehicle 102 may be a configured as a server to and/or a client of any device communicatively coupled to the vehicle 102 via the network 160. Specifically, the network 160 can be configured to enable the delivery of cloud resources to and/or from the vehicle 102. Any device communicatively coupled to the vehicle 102 can deliver a cloud resource to the vehicle 102 via the network 160. Similarly, the vehicle 102 can deliver a cloud resource via the network 160 to any device communicatively coupled to the vehicle 102. Accordingly, cloud resources such as, for example, processing, storage, software, and information can be shared via the network 160.

The network 160 may be utilized to communicatively couple the vehicle 102, one or more remote computing devices 162, one or more third party remote computing devices 164, one or more mobile phone devices 204, one or more vehicle access devices 168, and one or more user community devices 170. Accordingly, each of these devices can be communicatively coupled to one another directly or indirectly via the network 160. For example, one or more devices communicatively coupled to the network 160 can operate as an intermediary to transmit data between any of the other devices. Accordingly, the network 160 can facilitate a distributed computing arrangement amongst the vehicle 102 and the other devices. Specifically, any of the devices communicatively coupled to the network 160 can share cloud resources such that each communicatively coupled device can perform any portion of the logic described herein.

It should also be understood that while the components in FIG. 1 are illustrated as communicating through the network 160, this representation may also include instances of direct communication between the vehicle 102 and a device. As an example, the vehicle access device 168 and/or mobile device 166 (e.g., a mobile phone device) may communicate with the vehicle computing device 114 via a direct near field communication protocol. For example, the mobile device 166 may receive conditional personalized notification features and/or a notification method from a passenger in a vehicle.

As is noted above, the vehicle 102 can be communicatively coupled to the one or more devices via the network 160. Each of the one or more devices can include one or more processors and one or more memories. The one or more processors can execute logic to provide cloud resources to the vehicle 102 and/or any other device communicatively coupled to the network 160. For example, the one or more devices can provide supplementary processing power, via relatively high powered processors, to the vehicle 102. Additionally, the one or more devices can provide supplementary data storage to the vehicle 102. Moreover, the one or more devices can provide platforms such as, for example, a social networking service, news service, weather service, traffic service, map service (e.g., restaurant data, fuel station data, service station data), and any other service capable of being exchanged between a server and a client.

The user computing device 170 may also be coupled to the network 160 and may be configured as any portable and/or non-portable computing device, such as a personal computer, laptop computer, personal digital assistant (PDA), mobile phone, etc. In some aspects, the user computing device 170 may be implemented as the mobile phone device 166. Regardless, the user computing 104*a* may include a memory component that stores logic that is similar to the logic stored by the vehicle computing device 114, but configured for slightly different functionality. As an example, logic stored by the user computing device may be configured to cause the user computing device 170 to provide interfaces and receive user input related to providing access to the vehicle 102. Similarly, this logic may be configured to cause the user computing device 170 to provide interfaces and options related to user schedules that may be utilized in the vehicle 102. The logic may be similarly configured to cause the user computing device 170 to provide interfaces and/or options for configuring user vehicle routing preferences, as discussed in more detail, below.

Similarly, the remote computing device 162 may include a server and/or other computing device for providing information to the vehicle computing device 114 and/or the mobile phone device 166. In some aspects, the remote computing device 162 may include a memory component for storing logic that is similar to the other logic discussed above, but may be configured for different functionality. More specifically, the logic stored by the remote computing device 162 may be configured to remotely store and provide vehicle access data, user scheduling data, and/or user routing preference data. Thus, the remote computing device 162 may be configured for "cloud" storage of data described herein.

Also included is the third party remote computing device 164. The third party remote computing device 164 may be configured to compile and/or store third party data, such as news, weather reports, traffic reports, restaurant data, fuel station data, service station data, etc. This data may also be accessed by the vehicle computing device 114. For example, this data may be accessed by the vehicle computing device 114 to determine some aspects of a driving environment of the vehicle.

Figure 2A:
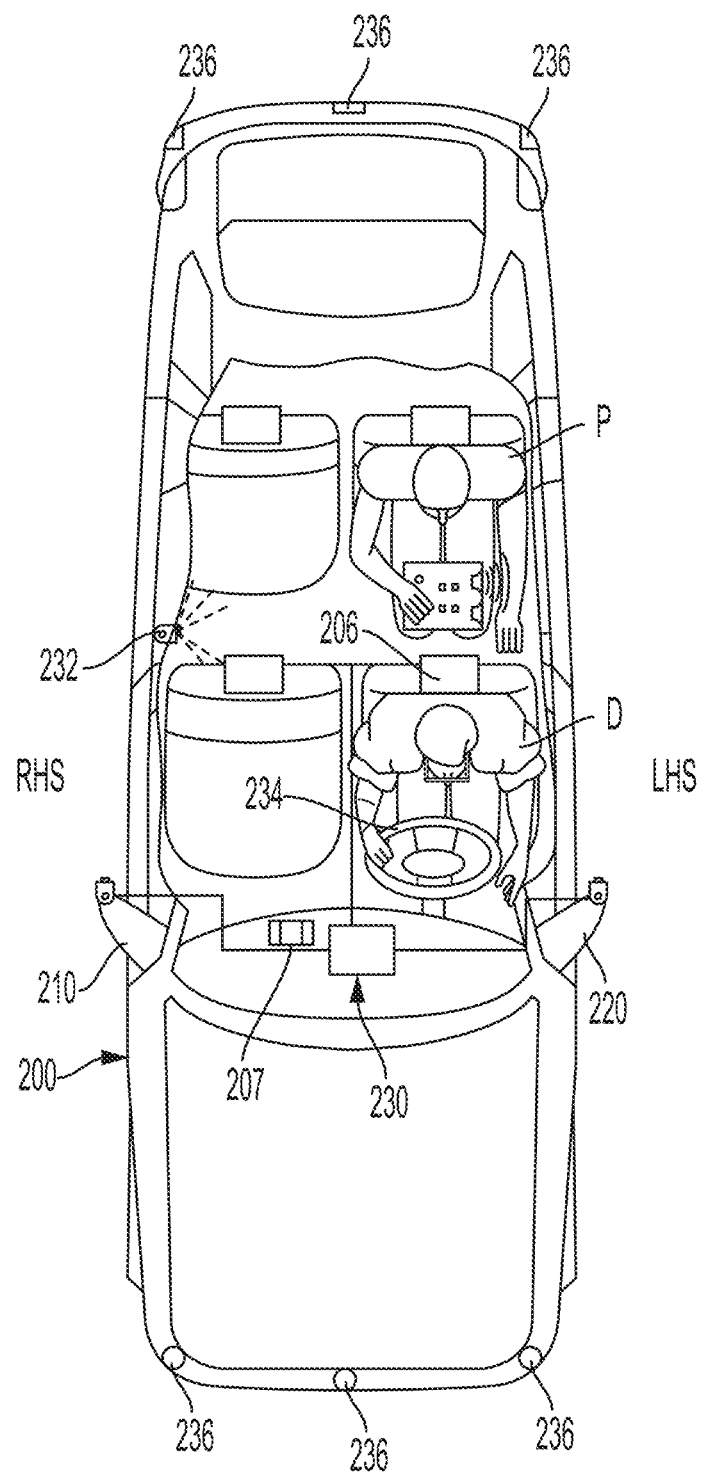
FIGS. 2A, 2B, and 2C are schematic illustrations of a vehicle with a personalized notification system, according to aspects of the present disclosure.

FIG. 2A is a schematic of a vehicle 200. The vehicle 200 can have a right rearview mirror 210, a left rearview mirror 220, and a personalized notification system 230. The personalized notification system 230 may be part of a driver/passenger interface device integrated with the vehicle 200. The personalized notification system 230 may cause a passenger of the vehicle to be notified based on received conditional personalized notification features and/or the notification method set up by the passenger. For example, the personalized notification system causes a passenger to be notified of one or more locations along a route of the vehicle according to the received conditional personalized notification features.

The personalized notification system 230 may be coupled to an output device for notifying the passenger (e.g., an indicator light 232 at a right hand side (RHS) of the vehicle 200). The personalized notification system 230 may be coupled with a sensor system having sensors 236 defined around the vehicle 200. For simplicity, in FIG. 2, the sensors 236 are defined in a rear section and a front section of the vehicle 200. Still, the sensors may be used to detect the driving environment from a 360° perspective. The sensors 236 may provide information related to the conditional personalized notification features (e.g., road hazard information, emergency, speed threshold alert, object proximity alert) received by the personalized notification system 230. The sensors 236 may include radio detection and ranging (RADAR), light detection and ranging (LIDAR), sound navigation ranging (SONAR), or another type of sensor.

Information received by the personalized notification system 230 from the sensor system may be used to determine the current driving environment of the vehicle. For example, the current driving environment of the vehicle is monitored to determine whether a condition of the conditional personalized notification features is satisfied. In one aspect, the personalized notification system uses the information from the sensor system in conjunction with the vehicle's current location (e.g. obtained via a global positioning system (GPS)), speed (e.g. also obtained via GPS), the route to the next destination, and the current traffic information to evaluate each condition. When a condition is satisfied, the system notifies the corresponding passenger via an output device such as the indicator light 232. The notification may be an audio output, haptic feedback, a visual notification, and/or another type of notification.

In one or more aspects, the sensor system can include one or more cameras. "Camera" is defined as any device, component, and/or system that can capture visual data. "Visual data" includes video and/or image information/data. The visual data can be in any suitable form. In one or more aspects, one or more of the cameras can include a lens (not shown) and an image capture element (not shown). The image capture element can be any suitable type of image capturing device or system, including, for example, an area array sensor, a charge coupled device (CCD) sensor, a complementary metal oxide semiconductor (CMOS) sensor, or a linear array sensor. The image capture element may capture images in any suitable wavelength on the electromagnetic spectrum. The image capture element may capture color images and/or grayscale images. One or more of the cameras can be configured with zoom in and/or zoom out capabilities.

Additional notifications may be provided to the occupant or passenger of the vehicle. The additional notifications may be more granular in comparison to conventional notifications. The mechanism or system may employ different modalities to provide the notification, such as audio feedback, haptic feedback, or visual feedback. For example, each additional notifications may be used for different conditions. For example, one additional notification (e.g., audio output) may be set to communicate a first satisfied condition (e.g., location) to the passenger. Another additional notification (e.g., haptic feedback) may be set to communicate a second satisfied condition (e.g., emergency) to the passenger.

Figure 2B:
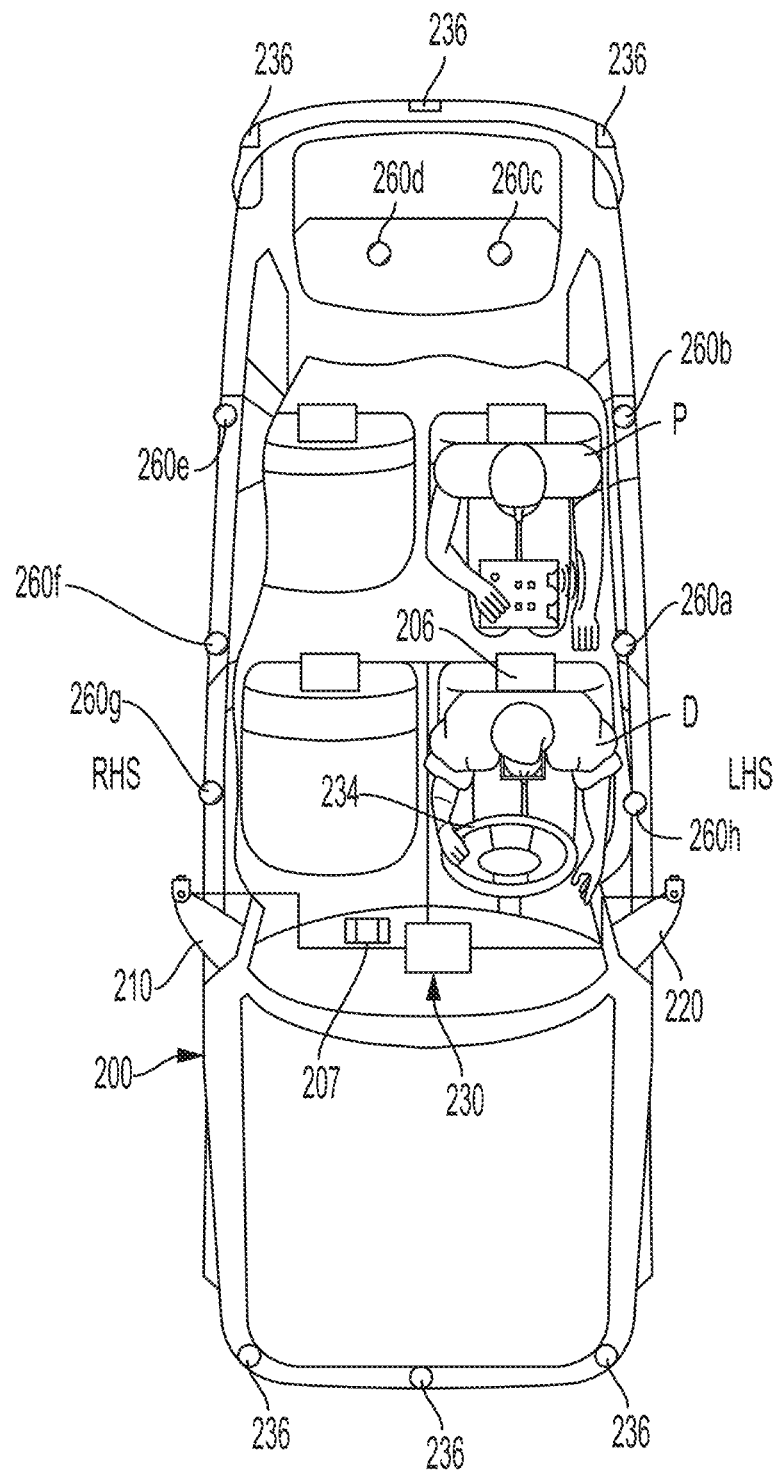
Figure 2C:
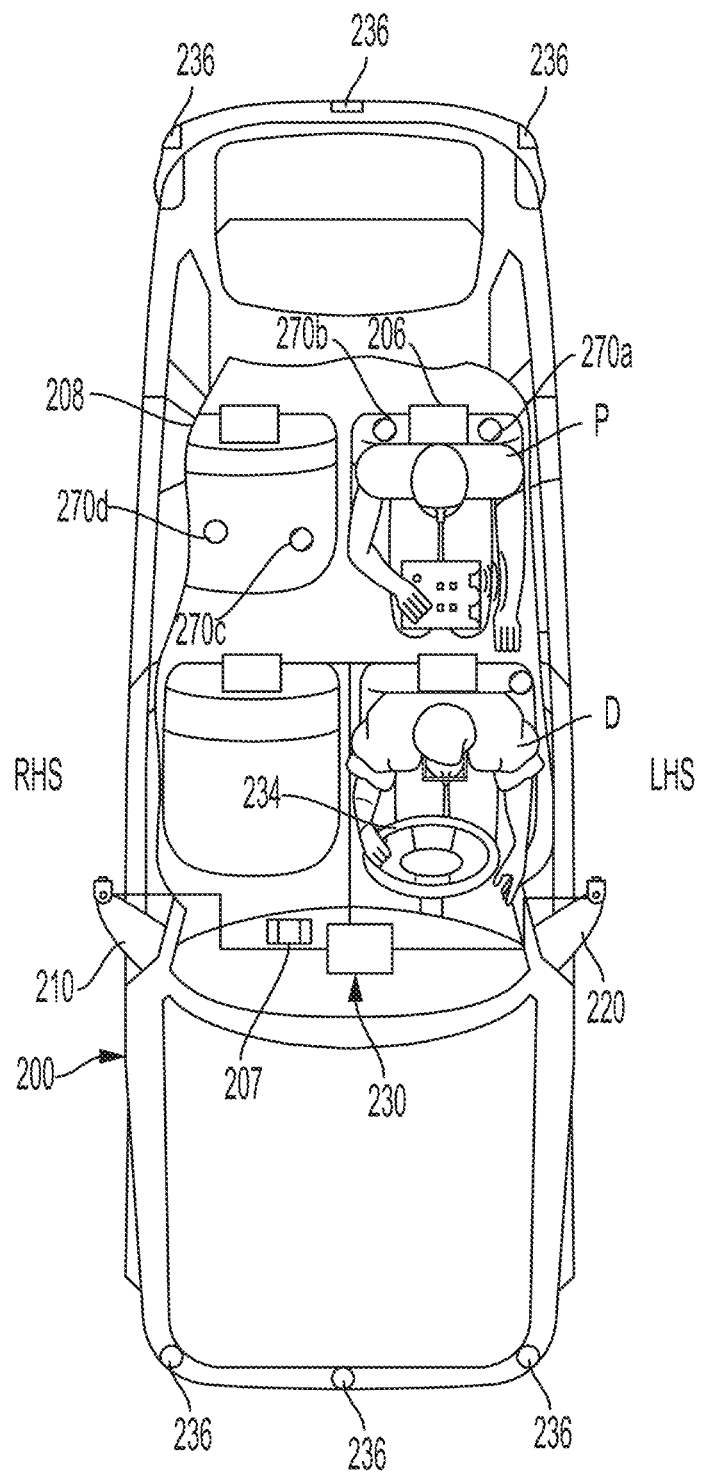

The personalized notification system 230 may be physically connected to, or wirelessly coupled to, one or more sets of output devices within the vehicle to provide the notifications to the passenger. One set of output devices may include a set of audio feedback devices 260a-h (FIG. 2B). Another set of output devices may include haptic feedback devices 270a-d (FIG. 2C). Yet another set of output devices may include visual feedback devices. In one example, the personalized notification system 230 may be directly connected to each feedback device. For example, the personalized notification system 230 may be selectively coupled to each of the output devices. Thus, the personalized notification system 230 can select one or more of the output devices to provide the notification to the passenger based on the conditional personalized notification features and/or the notification method set up by the passenger.

An existing audio speaker of the vehicle 200 may be used as one of the audio feedback devices 260a-h. Also, the audio feedback devices 260a-h may use audio output devices that are independent of the existing vehicle speakers. Aspects of the present disclosure may also use a combination of the existing vehicle speakers and independent output devices for the audio feedback devices 260a-h.

Additionally, an existing visual output device (e.g., an indicator light 232) of the vehicle 200 may be used as one of the visual feedback devices. Alternatively, the visual feedback devices may be visual output devices that are independent of the existing visual output devices. Aspects of the present disclosure may also use a combination of the existing visual output devices and independent visual output devices for the visual feedback devices (see FIG. 3).

Finally, an existing haptic output device of the vehicle 200 may be used as one of the haptic feedback devices 270a-d. Alternatively, the haptic feedback devices 270a-d may also be haptic output devices that are independent of the existing haptic output devices. Aspects of the present disclosure may also use a combination of the existing haptic output devices and independent haptic output devices for the haptic feedback devices 270a-d.

FIG. 2B illustrates an example of the vehicle 200 with audio feedback devices 260a-h according to aspects of the present disclosure. As shown in FIG. 2B, a first audio feedback device 260a may be a speaker (e.g., audio output device) defined between the driver D and a driver side passenger P. A second audio feedback device 260b may be a rear corner driver side speaker. A third audio feedback device 260c may be a back driver side speaker. The fourth audio feedback device 260d may be a back passenger side speaker. A fifth audio feedback device 260e may be a rear corner passenger side speaker. The sixth audio feedback device 260f may be defined on a passenger side, between a front and rear passenger. The seventh localized feedback device 260g may be a front corner passenger side speaker. Finally, an eighth audio feedback device 260h may be a front corner driver side speaker. Aspects of the present disclosure are not limited to the audio feedback device 260a-h layout of FIG. 2B, other layouts are contemplated.

The personalized notification system 230 generate notifications, such as audio feedback, haptic feedback, visual feedback, and/or types of feedback, to alert an occupant of the vehicle 200 that a condition has been satisfied in accordance with the passengers set up. Specifically, the personalized notification system 230 generates a notification to be output at one or more feedback devices when the condition is satisfied.

The one or more feedback devices may include feedback devices from one or more sets of feedback devices. For example, the feedback device may be generated at one or more audio feedback devices 260a-h as well as one or more visual feedback devices. As another example, the notification may be exclusive to a specific set of feedback devices. For example, the notification may be exclusive to the audio feedback devices 260a-h.

The personalized notification system 230 causes the notification to be generated in various locations of the vehicle 200. For example, the locations may include the rear left, rear right, front left, front right, right side, or left side of the passenger compartment, driver seat, windshield, and/or steering wheel. The locations are not limited to the discussed locations, a notification may be generated at other locations.

Aspects of the present disclosure may also be used to generate an estimated time to the destination notification. For example, the estimated time to the destination notification is generated when an estimated time of arrival (ETA) of the vehicle 200 is less than five minutes. The estimated time to the destination notification may be localized within the passenger compartment based the set up by the passenger. Similarly, distance to a destination notification is generated when the destination is less than a threshold distance (e.g., fifty meters) away. The distance to the destination notification may be localized within the passenger compartment based the set up by the passenger. For example, the feedback devices selected for the estimated time to the destination notification may be different from the feedback devices for the distance to a destination notification. Additionally, or alternatively, an intensity of the notification may be varied based on the type of notification. For example, an emergency notification may be more intense than an estimated time to the destination notification.

In addition, an emergency notification is generated when an emergency situation occurs and is communicated to the personalized notification system 230 via sensors and other resources that emergency resource devices. In autonomous vehicles, there may already be a system for detecting an emergency. For example, information received from one or more sensors or from external devices can be used to determine that the vehicle is in an emergency situation. When the autonomous vehicle detects the emergency the personalized notification system 230 is aware of the emergency situation or is alerted by another device. A notification of the emergency is then provided to the feedback devices based on the set up by the passenger. In a manual driving vehicle, however, a driver can notify the personalized notification system 230 that the vehicle is (or will be) in an emergency situation. For example, "the vehicle is pulled over by a police" or "the vehicle is involved in a traffic accident."

The personalized notification system 230 may be coupled to a stereo system including a stereo 207 and speakers in the compartment of the vehicle 200. The stereo system may receive signals from the personalized notification system 230 to cause the speakers to produce the audio notification. In one configuration, the audio notification is prioritized over other sounds (e.g., music) from the stereo system of the vehicle 200. The audio notification may subside after the event causing the notification is complete. Alternatively, the music may fade when the audio notification is output.

In one configuration, rather than generating an audio notification, the personalized notification system 230 localizes the music to specific audio feedback devices to alert the occupant of the event. In another configuration, an absence of sound is used to notify the occupant of an event. Whether the notification is prioritized over the music or other features may be based on a passenger's/user's preference.

FIG. 2C illustrates an example of the vehicle 200 with haptic feedback devices 270a-d according to aspects of the present disclosure. For haptic feedback, the personalized notification system 230 may cause a section of a seat 206 (e.g., a driver seat or passenger seat), a steering wheel 234, or other location to generate haptic feedback (e.g., vibrate) when a condition is satisfied. The seat 206 may include a first haptic feedback device 270a on a left hand side (LHS) of the seat 206 and a second haptic feedback device 270b on a right hand side (RHS) of the seat 206. A seat 208 may include the third haptic feedback device 270c and a fourth haptic feedback device 270d.

The personalized notification system 230 provides a signal to the fourth haptic feedback device 270d that causes the right side of the seat 208 to vibrate. As another example, the personalized notification system 230 may provide a signal to the third haptic feedback device 270c to cause the left side of the seat 208 to vibrate.

For simplicity, the first haptic feedback device 270a and the second haptic feedback device 270b are illustrated on a backrest of the driver seat 206. The haptic feedback devices 270a, 270b are not limited to the backrest and may be located on other parts of the seat 206. For example, the seat 206 may include haptic feedback devices on the seat base (similar to the third haptic feedback device 270c and the fourth haptic feedback device 270d in the seat 208) or on arm rests associated with the seats. Additionally, the seats 206 and 208 are not limited to two haptic feedback devices 270a and 270b or 270c and 270d. Each seat 206, 208 may have more or less haptic feedback devices. Furthermore, other seats in the vehicle 200 may also include haptic feedback devices.

Aspects of the present disclosure are not limited to the combinations of notifications discussed above. Other combinations of notification are contemplated. For example, the personalized notification system 230 may use any combination of visual feedback, audio feedback, haptic feedback, and other types of feedback to localize a notification based on a setting by an occupant or passenger of the vehicle.

In one aspect, the type of notification (e.g., type of sound, type of vibration, or color of a visual output) may be adjusted based on a proximity of the vehicle to a destination, a relative speed of the vehicle, and/or another condition. For example, the personalized notification system 230 morphs the notification according to a change in a condition (e.g., location) of the vehicle.

In one aspect, the notification is morphed based on a proximity of the vehicle to a destination, a relative speed of the vehicle, and/or another condition. As one example, the personalized notification system 230 morphs a notification sound as the vehicle 200 moves closer and closer to the destination. That is, the audio output at a speaker may increase as the vehicle moves closer to the destination or the as the time to the destination reduces. In one aspect, a pitch of the notification may be shifted to simulate the Doppler effect, to convey information about the relative speed to the occupant or passenger of the vehicle. Morphing the output may improve the occupant's (D or P) overall contextual awareness. The personalized notification system 230 uses this environmental information to cause the notification to morph according to a changing condition of the notification or a changing condition of the event set up by the occupant or passenger of the vehicle 200.

The personalized notification system 230 may also change an intensity of the haptic feedback (e.g., vibration) or change a feedback device based on a proximity of the vehicle to a destination, a relative speed of the vehicle, and/or another condition. The intensity refers to a strength of the haptic feedback. For example, the haptic feedback may vertically or horizontally traverse the seat 206 as the vehicle 200 moves closer to the destination.

In some aspects, a notification may be dynamically adjusted based on an assessment of the risks associated with the current event. For example, the volume of the alert, the intensity of the light, or the intensity of the haptic signal may be dynamically adjusted based on the risks associated with an emergency situation. In one configuration, the personalized notification system 230 prioritizes the notification over other features (e.g., music). The prioritization may be based on a user configuration or an assessed risk of an event.

Figure 3:
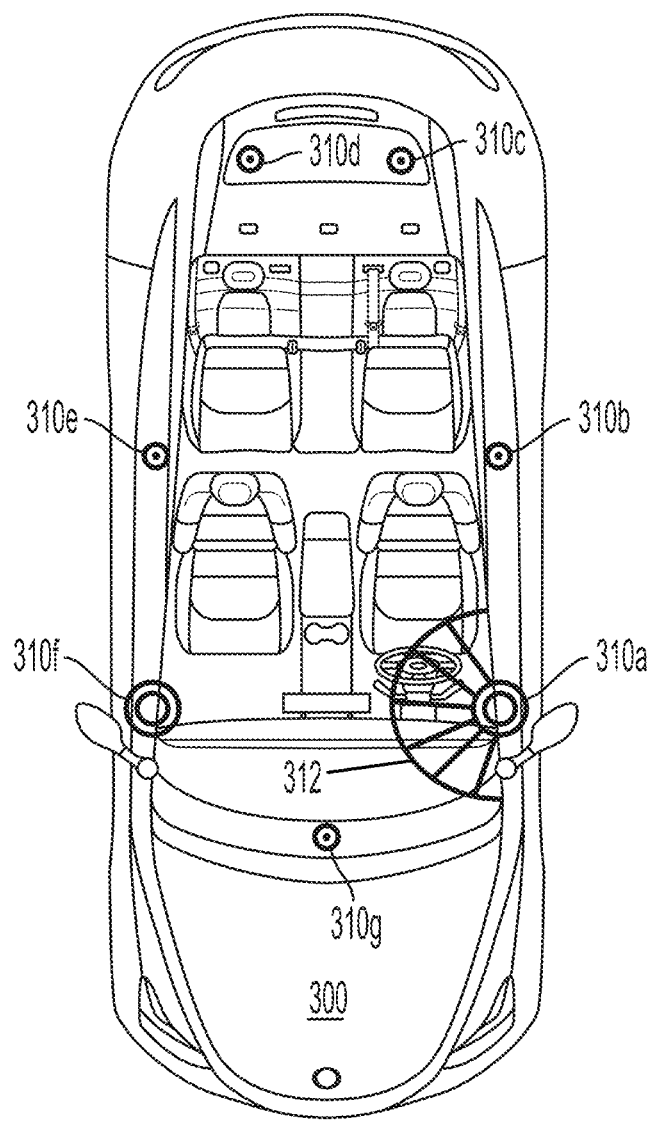
FIG. 3 is a schematic illustration of a vehicle with a personalized notification system, according to aspects of the present disclosure.

FIG. 3 illustrates an example of generating visual notifications according to aspects of the present disclosure. A personalized notification system (e.g., the personalized notification system 230) generates visual notifications to the occupant of the vehicle based on the passenger preference. The visual notifications may be output via lights or other visual output devices based on the conditional personalized notification features and the notification method. That is, visual feedback devices 310a-g may be defined within a passenger compartment (e.g., cockpit) of the vehicle 300. Lights or other visual output devices may be used to generate a visual output 312 from each visual feedback device 310a-g. The visual notification may be a flashing light, a sustained light, or another type of visual notification.

The visual notification is not limited to a notification from one of the feedback devices 310a-g. Additionally, or alternatively, the visual notifications may be output via display alert icons at different locations on a windshield/head-up display, dashboard display, or other display. The type of visual notification may be dependent on the current interior lighting and/or exterior lighting (e.g., night time or day time).

Figure 4:
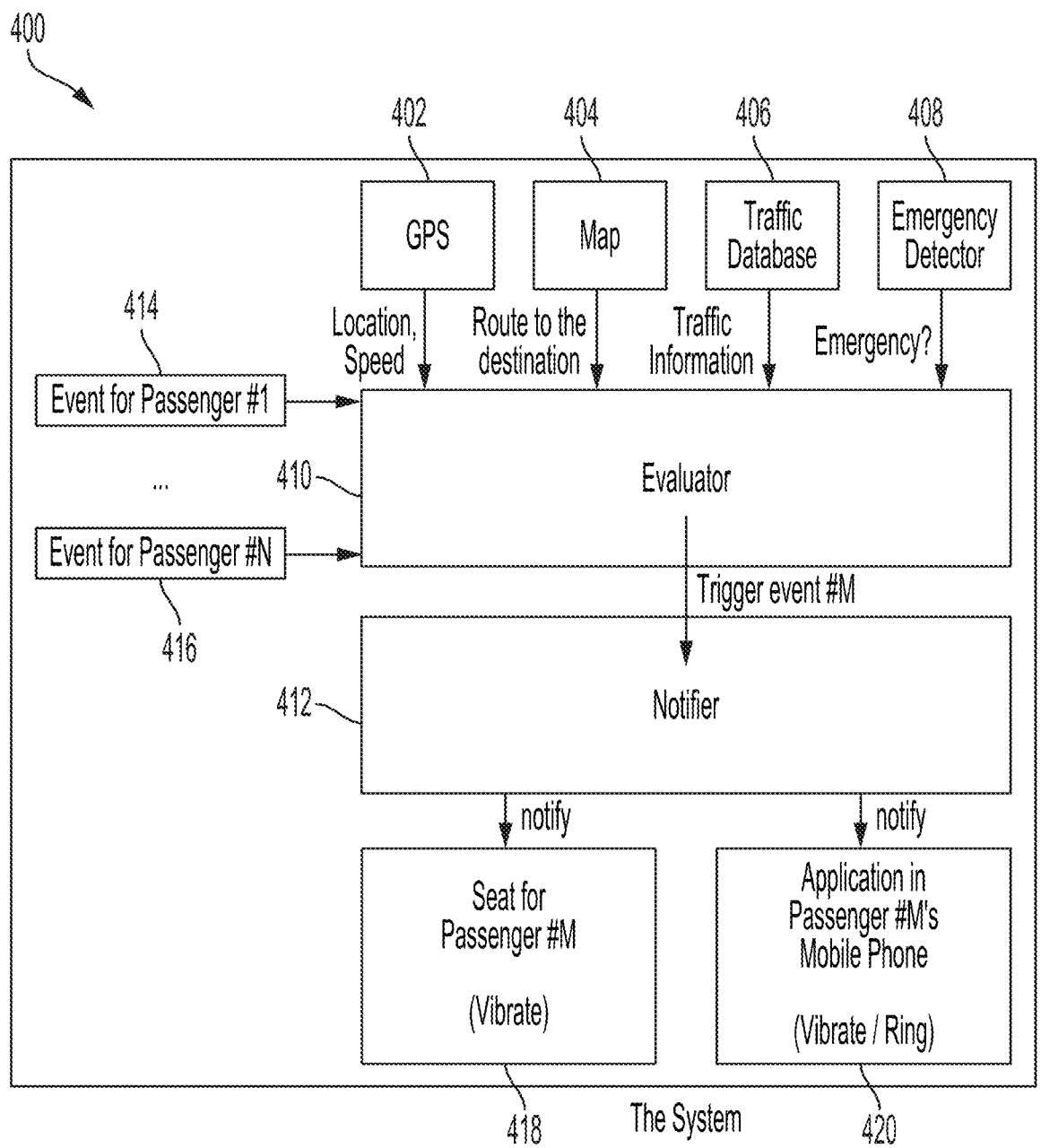
FIG. 4 illustrates an example of a notification system, according to aspects of the present disclosure.

FIG. 4 illustrates a notification system 400 according to aspects of the present disclosure. The notification system 400 includes a global positioning system (GPS) device 402, a map device 404, a traffic database device 406, an emergency detector device 408, an evaluator 410, a notifying device 412, a first evaluator input 414 and a second evaluator input 416, first output device 418 and a second output device 420. In one aspect, the evaluator 410 and the notifying device 412 are part of a personalized notification system (e.g., the personalized notification system 230).

The evaluator receives conditional personalized notification features and/or the notification method set up by one or more passengers or occupants of the vehicle. For example, all of the events that the passengers set for conditional notification are received are received via inputs (e.g., the first evaluator input 414 and the second evaluator input 416) of the evaluator 410.

The evaluator 410 also receives information related to the vehicle environment that is used to determine whether the conditions set up by the occupant or passenger of the vehicle are satisfied. The information may be obtained from the global positioning system (GPS) device 402, the map device 404, the traffic database device 406, the emergency detector device 408 and/or other devices (e.g., sensors of a sensor system of the vehicle). The evaluator evaluates the notification conditions set by the passengers using the environmental information at intervals (e.g., every cycle). Whenever the evaluation result is true (e.g., a condition is satisfied), the evaluator passes a trigger notification information to the notifying device 412. The notifying device 412 notifies the corresponding passenger (e.g., passenger #M) via an output device 418 at a seat of the passenger or an output device 420 associated with an application in the passenger's mobile phone. The notification may be an audio output, haptic feedback, a visual notification, and/or another type of notification.

Figure 5:
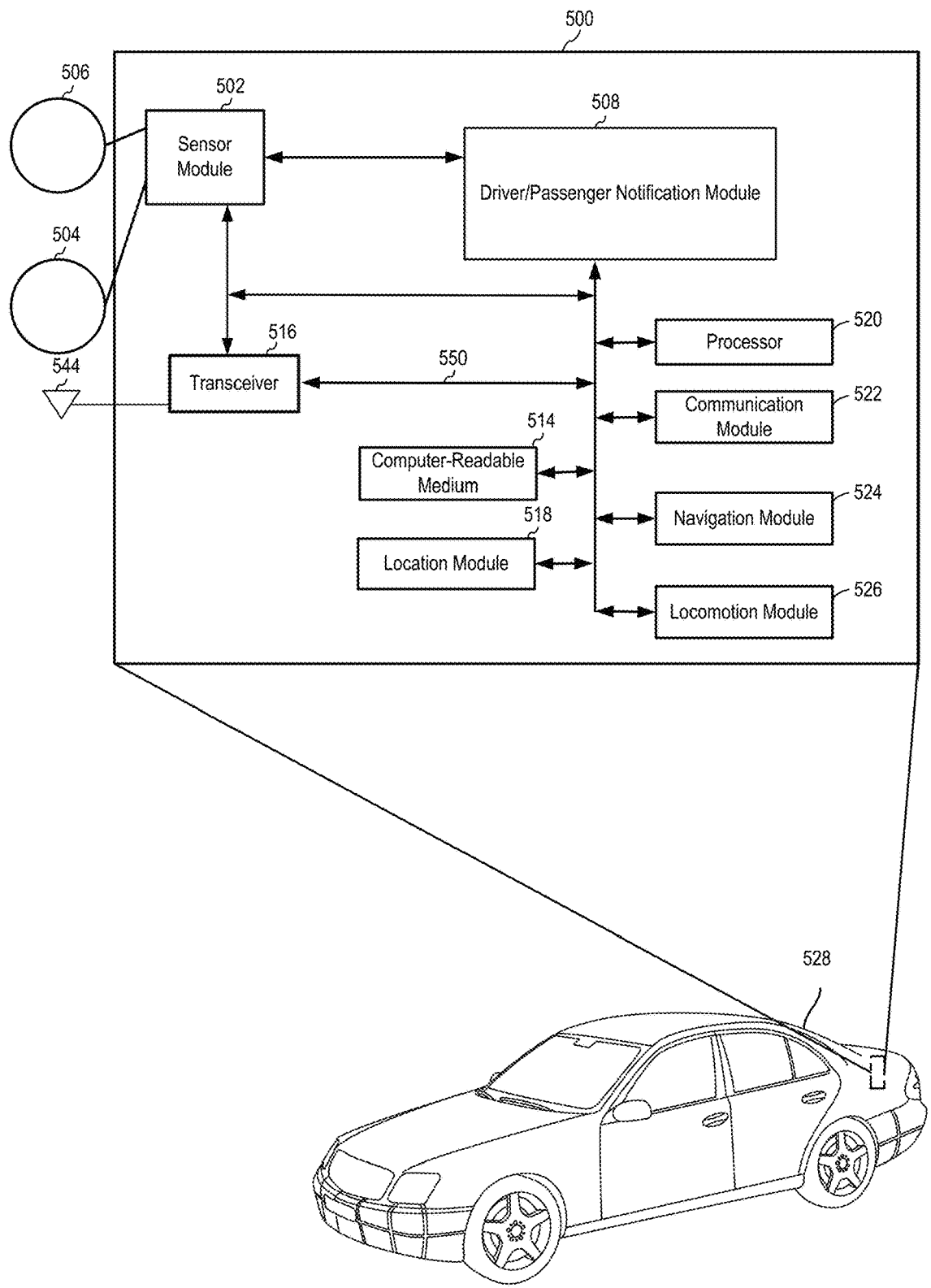
FIG. 5 is a diagram illustrating an example of a hardware implementation for a personalized notification system according to aspects of the present disclosure.

FIG. 5 is a diagram illustrating an example of a hardware implementation for a personalized notification system 500, according to aspects of the present disclosure. The personalized notification system 500 may be a component of a vehicle, a robotic device, or another device. For example, as shown in FIG. 5, the personalized notification system 500 is a component of an autonomous vehicle 528. Although the personalized notification system 500 is located in the back of the vehicle 528, the personalized notification system 500 may be located anywhere in the vehicle (e.g., the front of the vehicle). Aspects of the present disclosure are not limited to the autonomous vehicle 528, as other devices, such as a bus, train, boat, drone, or robot, are also contemplated for using the personalized notification system 500. The autonomous vehicle 528 may be autonomous or semi-autonomous.

The personalized notification system 500 may be implemented with a bus architecture, represented generally by a bus 550. The bus 550 may include any number of interconnecting buses and bridges depending on the specific application of the personalized notification system 500 and the overall design constraints. The bus 550 links together various circuits including one or more processors and/or hardware modules, represented by a processor 520, a communication module 522, a location module 518, a sensor module 502, a locomotion module 526, a navigation module 524, a computer-readable medium 514, and a driver/passenger notification module 508. The bus 550 may also link various other circuits such as timing sources, peripherals, voltage regulators, and power management circuits, which are well known in the art, and therefore, will not be described any further.

The personalized notification system 500 includes a transceiver 516 coupled to the processor 520, the sensor module 502, the driver/passenger notification module 508, the communication module 522, the location module 518, the locomotion module 526, the navigation module 524, and the computer-readable medium 514. The transceiver 516 is coupled to an antenna 544. The transceiver 516 communicates with various other devices over a transmission medium. For example, the transceiver 516 may receive commands via transmissions from a user or a remote device. As another example, the transceiver 516 may transmit driving statistics and information, environmental information and other desirable information from the driver/passenger notification module 508 to a server (not shown) or to localized feedback devices within the vehicle 528.

The personalized notification system 500 includes the processor 520 coupled to the computer-readable medium 514. The processor 520 performs processing, including the execution of software stored on the computer-readable medium 514 providing functionality according to the disclosure. The software, when executed by the processor 520, causes the personalized notification system 500 to perform the various functions described for a particular device, such as the autonomous vehicle 528, or any of the modules 502, 514, 516, 518, 520, 522, 524, 526. The computer-readable medium 514 may also be used for storing data that is manipulated by the processor 520 when executing the software.

The sensor module 502 may be used to obtain measurements or environmental information via different sensors, such as a first sensor 506 and a second sensor 504. In one aspect, the sensors may provide road hazard information, emergency, speed threshold alert, object proximity alert, etc. For example, the sensors may detect the specific location of an object, a velocity of the object, and a direction of the object. The first sensor 506 may be a vision sensor, such as a stereoscopic camera or a red-green-blue (RGB) camera, for capturing 2D images. The second sensor 504 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 504, 506.

The measurements of the first sensor 506 and the second sensor 504 may be processed by one or more of the processor 520, the sensor module 502, the communication module 522, the location module 518, the driver/passenger notification module 508, the locomotion module 526, and the navigation module 524, in conjunction with the computer-readable medium 514, to implement the functionality described herein. In one configuration, the data captured by the first sensor 506 and the second sensor 504 may be transmitted to an external device via the transceiver 516. The first sensor 506 and the second sensor 504 may be coupled to the autonomous vehicle 528 or may be in communication with the autonomous vehicle 528.

The location module 518 may be used to determine a location of the autonomous vehicle 528. For example, the location module 518 may use a global positioning system (GPS) to determine the location of the autonomous vehicle 528. The communication module 522 may be used to facilitate communications via the transceiver 516. For example, the communication module 522 may be configured to provide communication capabilities via different wireless protocols, such as WiFi, long term evolution (LTE), 4G, etc. The communication module 522 may also be used to communicate with other components of the autonomous vehicle 528 that are not modules of the personalized notification system 500.

The locomotion module 526 may be used to facilitate locomotion of the autonomous vehicle 528. As an example, the locomotion module 526 may control the movement of the wheels. As another example, the locomotion module 526 may be in communication with a power source of the autonomous vehicle 528, such as an engine or batteries. Of course, aspects of the present disclosure are not limited to providing locomotion via wheels and are contemplated for other types of components for providing locomotion, such as propellers, treads, fins, and/or jet engines.

The personalized notification system 500 also includes the navigation module 524 for planning a route or controlling the locomotion of the autonomous vehicle 528, via the locomotion module 526. The navigation module 524 may be in communication with the driver/passenger notification module 508, the sensor module 502, the transceiver 516, the processor 520, the communication module 522, the location module 518, the locomotion module 526, the navigation module 524, and the computer-readable medium 514.

The modules may be software modules running in the processor 520, resident/stored in the computer-readable medium 514, one or more hardware modules coupled to the processor 520, or some combination thereof.

According to aspects of the present disclosure, the personalized notification system 500 includes a driver/passenger notification module 508 in communication with the navigation module 524, the sensor module 502, the transceiver 516, the processor 520, the communication module 522, the location module 518, the locomotion module 526, and the computer-readable medium 514.

In one configuration, the driver/passenger notification module 508 causes the multiple feedback devices to generate a notification based on the conditional personalized notification features and the notification method set up by the occupant/passenger of the vehicle 528. For example, evaluator (e.g., the personalized notification system 500 or the driver/passenger notification module 508) receives conditional personalized notification features and/or the notification method set up by one or more passengers or occupants of the vehicle. The personalized notification system 500 or the driver/passenger notification module 508 also receives information related to the vehicle environment that is used to determine whether the conditions set up by the occupant or passenger of the vehicle are satisfied. Additional environmental information may be provided to or by the navigation module 524, the transceiver 516, the processor 520, the communication module 522, the location module 518, the locomotion module 526, and the computer-readable medium 514.

The personalized notification system 500 or the driver/passenger notification module 508 evaluates the notification conditions set by the passengers using the environmental information at intervals (e.g., every cycle). Whenever the evaluation result is true (e.g., a condition is satisfied), the personalized notification system 500 or the driver/passenger notification module 508 notifies the corresponding passenger via an output device at a seat of the passenger or an output device associated with an application in the passenger's mobile phone. The notification may be an audio output, haptic feedback, a visual notification, and/or another type of notification.

Figure 6:
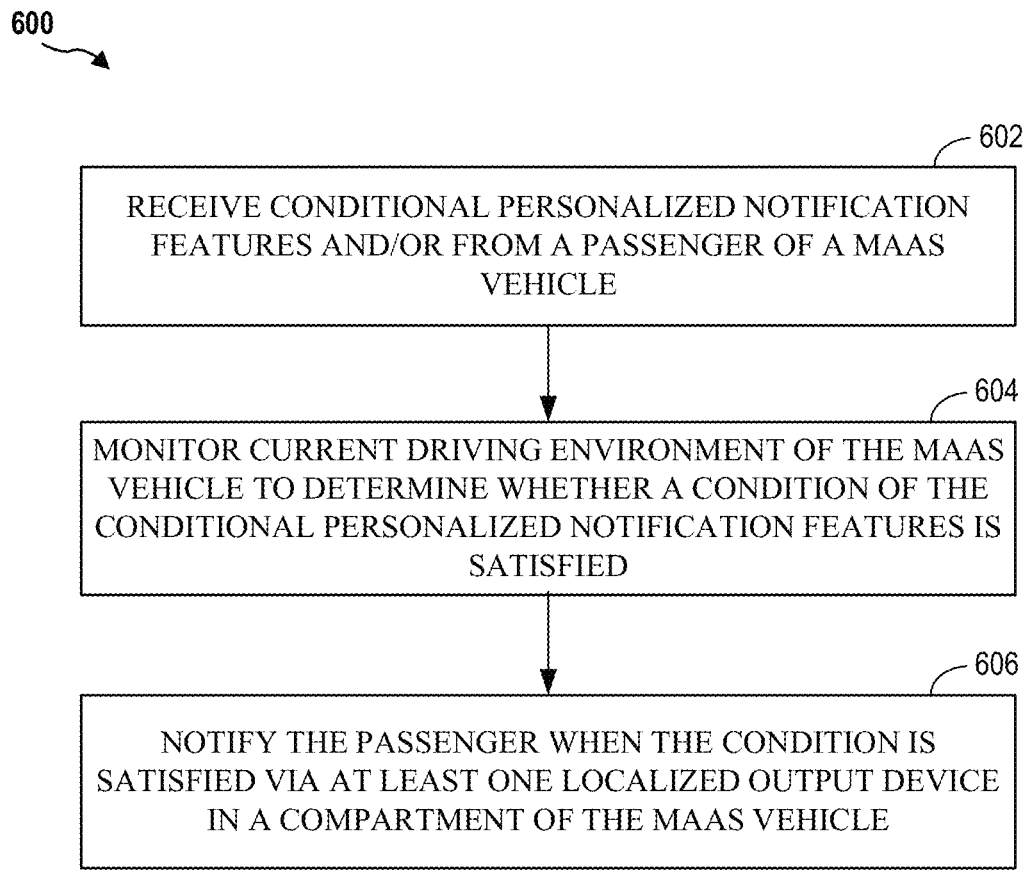
FIG. 6 illustrates a flow diagram for providing notification via a personalized notification system according to aspects of the present disclosure.

FIG. 6 illustrates a flow diagram for a personalized notification method for mobility as a service, according to an aspect of the present disclosure. As shown in FIG. 6, at block 602, conditional personalized notification features from a passenger of the MaaS vehicle are received. At block 604, current driving environment of the MaaS vehicle are monitored to determine whether a condition of the conditional personalized notification features is satisfied. At block 606, the passenger is notified when the condition is satisfied via at least one localized output device in a compartment of the MaaS vehicle.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A personalized notification method for a mobility as a service (MaaS) vehicle, comprising:
   receiving conditional personalized notification features from a passenger of the MaaS vehicle, including a notification preference;
   selecting, by a personalized notification system in the MaaS vehicle, at least one of a plurality of output devices coupled to the personalized notification system, the selecting based on the notification preference;
   monitoring current driving environment of the MaaS vehicle to determine whether a condition of the conditional personalized notification features is satisfied according to at least one of a current location of the MaaS vehicle, a current speed of the MaaS vehicle, a route to a destination, and/or current traffic information;
   displaying a notification to the passenger when the condition is satisfied via the at least one selected output device; and
   morphing the notification based on at least one of proximity of the MaaS vehicle to the destination, the current speed of the MaaS vehicle, or a combination thereof.

2. The method of claim 1, in which the conditional personalized notification features are received via a personalized interface in the MaaS vehicle or a mobile application on a mobile device.

3. The method of claim 1, in which the conditional personalized notification features comprise at least one of a distance to a destination, an estimated time to the destination, an emergency situation, or a combination thereof.

4. The method of claim 1, further comprising prioritizing the notification over other sounds from a stereo system of the MaaS vehicle.

5. The method of claim 1, in which the notification is output via an existing visual output device.

6. An apparatus for personalized notification of an occupant of a mobility as a service (MaaS) vehicle, the apparatus comprising:
   a memory; and
   at least one processor coupled to the memory, the at least one processor configured:
      to receive conditional personalized notification features from a passenger of the MaaS vehicle, including a notification preference;
      to select, by a personalized notification system in the MaaS vehicle, at least one of a plurality of output devices coupled to the personalized notification system, the selecting based on the notification preference;
      to monitor current driving environment of the MaaS vehicle to determine whether a condition of the conditional personalized notification features is satisfied according to at least one of a current location of the MaaS vehicle, a current speed of the MaaS vehicle, a route to a destination, and/or current traffic information;
      to display a notification to the passenger when the condition is satisfied via the at least one selected output device; and
      to morph the notification based on at least one of proximity of the MaaS vehicle to the destination, the current speed of the MaaS vehicle, or a combination thereof.

7. The apparatus of claim 6, in which the at least one processor is further configured to cause a personalized interface in the MaaS vehicle or a mobile application on a mobile device to receive the conditional personalized notification features.

8. The apparatus of claim 6, in which the conditional personalized notification features comprise at least one of a distance to a destination, an estimated time to the destination, an emergency situation, or a combination thereof.

9. The apparatus of claim 6, in which the at least one processor is further configured to prioritize the notification over other sounds from a stereo system of the MaaS vehicle.

10. The apparatus of claim 6, in which the at least one processor is further configured to output the notification via an existing visual output device.

11. A non-transitory computer-readable medium having program code recorded thereon for personalized notification of an occupant of a mobility as a service (MaaS) vehicle, the program code executed by a processor and comprising:
   program code to receive conditional personalized notification features from a passenger of the MaaS vehicle, including a notification preference;
   program code to select, by a personalized notification system in the MaaS vehicle, at least one of a plurality of output devices coupled to the personalized notification system, the selecting based on the notification preference;
   program code to monitor current driving environment of the MaaS vehicle to determine whether a condition of the conditional personalized notification features is satisfied according to at least one of a current location of the MaaS vehicle, a current speed of the MaaS vehicle, a route to a destination, and/or current traffic information;
   program code to display a notification to the passenger when the condition is satisfied via the at least one output device; and program code to morph the notification based on at least one of proximity of the MaaS vehicle to the destination, the current speed of the MaaS vehicle, or a combination thereof.

12. The non-transitory computer-readable medium of claim 11, in which the program code further comprises program code to cause a personalized interface in the MaaS vehicle or a mobile application on a mobile device to receive the conditional personalized notification features.

\* \* \* \* \*